Feb. 28, 1956   R. G. FISCHER   2,736,099
CORE SAMPLE MICROMETER
Filed Aug. 18, 1952
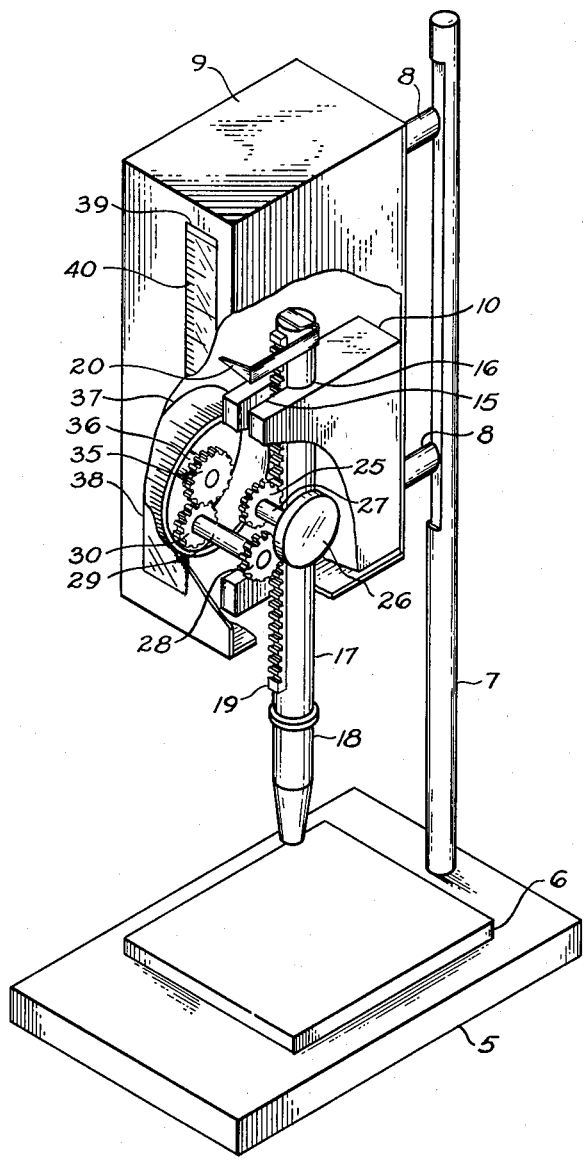
RUDOLF G. FISCHER
INVENTOR.
BY Frederick E. Dumoulin
ATTORNEY

United States Patent Office 2,736,099
Patented Feb. 28, 1956

2,736,099

CORE SAMPLE MICROMETER

Rudolf G. Fischer, Dallas, Tex., assignor, by mesne assignments, to Socony Mobil Oil Company, Inc., a corporation of New York Application August 18, 1952, Serial No. 305,047

5 Claims. (Cl. 33—147)

This invention relates to measuring instruments and relates more particularly to an instrument for measuring the dimensions of earth core samples.

In the analysis of cylindrical earth core samples a preliminary part of the procedure is the determination of the dimensions of the samples. In the past, these dimensions have been measured with conventional vernier micrometers, which is a tedious and time consuming process as the samples are usually analyzed in large numbers. Only fifteen to twenty samples can be measured in an hour with the conventional vernier micrometer and the accuracy obtainable with these instruments is greater than is normally necessary, the dimensions of the samples being required only to the nearest hundredth of an inch. With the instrument of this invention, approximately forty-five core samples per hour can be measured to an accuracy of one-hundredth of an inch, with an estimate possible to within thousandths of an inch. Also, when using conventional micrometers it has normally been necessary to use two separate vernier micrometers to measure the diameter and the length of the sample. The instrument here described may be used to make both of these measurements.

It is an object of the present invention to provide a measuring instrument for core samples which may be quickly and easily used to make measurements of both the length and diameter of the samples.

It is another object of the present invention to provide a measuring instrument for core samples which may be accurately and easily read to the nearest one-hundredth of an inch.

The above and further objects and features of the invention will be best understood from the following description of an embodiment thereof taken in connection with the accompanying drawing.

Referring to the drawing, 5 is a base to which is secured plate 6, which has a substantially flat bearing surface for supporting the sample to be measured. Mounted at the back center of the base is standard 7 extending upwardly therefrom. Secured to standard 7 by horizontal members 8 at a predetermined height above the upper surface of plate 6 is housing 9, which is shown partly broken away to reveal inner structure. The height of housing 9 above plate 6 is determined by the range of sizes of core samples which will be measured with the instrument. Secured to the inside back of housing 9 is supporting member 10. Vertical slot 15 is formed in member 10 substantially as shown, and at the base of slot 15 and opening into it is vertical sleeve 16 also formed in member 10. Slidably fitted in sleeve 16 is vertical rod 17. Threadedly engaged to the lower end of rod 17 is tip 18. Rod 17 is provided with rack bar 19 and pointer 20. Situated in slot 15 and meshing with rack 19 is gear 25, which is attached to operating knob 26 by shaft 27 which passes to slot 15 through two coincident apertures in housing 9 and member 10, respectively. Also situated in slot 15 is gear 28 which meshes with rack bar 19 and is secured to shaft 29 passing through another aperture in member 10 from slot 15. Fixed to the other end of shaft 29 is gear 30 meshing with gear 35 and gear 35 is secured to shaft 36 which in turn is secured to the center of drum scale 37. The drum scale is rotatably fixed to the inside of housing 9 and the outside periphery of the drum scale is inscribed into equal parts. Housing 9 in its front face is provided with ports 38 and 39. Port 38 is covered with a transparent material inscribed with a hairline, not shown, for observation of the position of drum scale 37. Secured within housing 9 behind pointer 20 so that it may be observed through port 39 is vertical scale 40. Port 39 is preferably covered with a transparent material, as is port 38, to allow observation of the scales and to prevent dirt entering the housing.

In one embodiment of the invention the vertical scale is divided into inches which are subdivided into tenths of inches and the drum scale is divided into 100 equal parts. The various gears are of such diameter that for each inch of movement of the vertical rod the drum scale rotates one time. Thus, readings with accuracy may be made on the vertical scale to one-tenth of an inch and on the drum scale to one-hundredth of an inch, with estimates being possible within thousandths of an inch.

Before taking a measurement with the instrument, its adjustment should be checked to insure an accurate reading. This is done by lowering rod 17 until the lower end of tip 18 rests on the upper surface of plate 6. The vertical scale and the drum scale should now both show readings of zero. If they do not, tip 18 which is threadedly secured to rod 17 may be raised or lowered relative to the rod until the scales will show a zero reading when the lower end of the tip is resting on plate 6.

With the tip of the instrument properly adjusted, a linear dimension of an object may now be measured. The rod 17 is raised by means of the operating knob 26 until the object to be measured may be placed under the tip 18. The object to be measured is placed upon plate 6 and the operating knob 26 is rotated until the tip 18 makes contact with the object. Readings are now taken by observing the vertical and the drum scales. Since the tip is always lowered into contact with the object of measurement, there is no necessity to correct for possible back lash of the rack bar 19 and the gears.

Having thus described my invention, it will be understood that such description has been given by way of illustration and example and not by way of limitation, reference for the latter purpose being had to the appended claims.

I claim:

1. A core sample micrometer comprising in combination a flat base, a substantially flat plate secured to the upper side of said base, a standard secured to said base and extending upwardly therefrom, a vertical rod movably secured to said standard, a tip threadedly secured to the lower end of said vertical rod, a rack bar made integral with said vertical rod, a gear engaging said rack bar for raising and lowering said vertical rod, an operating knob secured to said gear, a pointer arm secured to the upper end of said vertical rod, a vertical scale secured to said standard and cooperating with said pointer arm, a drum scale inscribed on its outer periphery into a plurality of equal parts, a gear fixed within and to a shaft of said drum scale, a gear connection between said gear and said rack bar whereby said drum scale is rotated one complete revolution for each unit of vertical movement of said vertical rod, and a reference point secured to said standard adjacent said drum scale.

2. A core sample micrometer comprising in combination a base having a flat upper surface, a flat plate secured to the upper surface of said base for supporting a sample to be measured, a standard secured to said base and extending upwardly therefrom, a substantially enclosed housing secured to said standard, a vertically disposed rod movably mounted within said housing and extending through the bottom of said housing and downward therefrom, a tip threadedly secured to the lower end of said vertical rod, a rack bar made integral with said vertical rod, a gear engaging said rack bar for moving said vertical rod upward and downward, a shaft fixed to said gear extending through the side of said housing, an operating knob secured to said shaft, a vertically inscribed scale mounted within said housing and visible through a port cut in said housing, a pointer arm secured to the upper end of said vertical rod cooperating with said vertical scale, a drum scale mounted on a shaft within said housing, said drum scale being inscribed on its outer periphery into a plurality of equal parts, a port in said housing for observing the position of said drum scale, a gear fixed within said drum scale on a shaft through the center of said drum scale, a gear connection between said gear and said rack bar whereby said drum scale is caused to move one complete revolution for each unit of travel of said measuring arm, and a reference line on said housing adjacent said port in front of said drum scale.

3. A core sample micrometer comprising in combination a base having a flat upper surface, a flat plate fixed to the upper surface of said base for supporting a sample to be measured, a standard mounted on and extending upwardly from said base, a plurality of horizontal supporting members extending outwardly from said standard, a housing secured to said horizontal supporting members, a supporting member situated within said housing having a vertical slot and a vertical sleeve formed therein, a vertical rod movably mounted in said last mentioned sleeve extending through the bottom of said housing and downward therefrom toward said base, a tip threadedly secured to the lower end of said rod, a rack bar made integral with said rod, a pointer arm mounted to the top of said rod, a vertically disposed port in the front of said housing, a vertically inscribed scale within said housing visible through said port and cooperating with said pointer, an operating knob situated without said housing gear connected to said rack bar for raising and lowering said vertical rod, a drum scale disposed within said housing, said drum scale being divided on its outer periphery into a plurality of equal parts, a gear connection between said rack bar and said drum scale, another port in said housing for observing said drum scale, and a reference point or line inscribed on said housing adjacent said last mentioned port.

4. A core sample micrometer comprising in combination a base having a flat upper surface, a flat plate fixed to the upper surface of said base for supporting a sample to be measured, a standard mounted on and extending upwardly from said base, a plurality of horizontal supporting members secured to said standard at a predetermined distance above said base and extending outwardly from said standard over said base, a housing secured to said horizontal supporting members, a supporting member secured within said housing to the back thereof, a vertical sleeve in said last mentioned supporting member, said last mentioned supporting member having a vertical slot opening from without said member into said vertical sleeve, a vertical measuring rod slidably secured within said vertical sleeve and extending through the bottom of said housing and downward therefrom toward said base, a tip threadedly secured to the lower end of said rod, a rack bar made integral with said rod extending a short distance into said vertical slot, a pointer arm secured to the top of said rod, a vertically disposed port in the front of said housing, a vertically inscribed scale within said housing visible through said port and cooperating with said pointer, a first gear positioned within said slot meshing with said rack bar for raising and lowering said measuring rod, a shaft secured to said first gear and extending to without said housing, an operating knob secured to said shaft without said housing, a second gear positioned within said vertical slot meshing with said rack bar, a shaft secured at one end thereof to said second gear, a third gear secured to the other end of said last mentioned shaft within said housing, a drum scale rotatably secured within said housing, a shaft secured within said drum scale at the center thereof, a fourth gear secured on said last mentioned shaft meshing with said third gear, a port in said housing in front of said drum scale permitting observation of said drum scale from without said housing, and a reference line on said housing adjacent said last mentioned port for observing the position of said drum scale.

5. A core sample micrometer comprising in combination a base having a flat upper surface, a flat plate fixed to the upper surface of said base for supporting a sample to be measured, a standard mounted on and extending upwardly from said base, a plurality of horizontal supporting members secured to said standard at a predetermined distance above said base and extending outwardly from said standard over said base, a housing secured to said horizontal supporting members, a supporting member secured within said housing to the back thereof, a vertical sleeve in said last mentioned supporting member, said last mentioned supporting member having a vertical slot opening from without said member into said vertical sleeve, a vertical measuring rod slidably secured within said vertical sleeve and extending through the bottom of said housing and downward therefrom toward said base, a tip threadedly secured to the lower end of said rod, a rack bar made integral with said rod extending a short distance into said vertical slot, a pointer arm secured to the top of said rod, a vertically disposed port in the front of said housing, a vertically inscribed scale within said housing visible through said port and cooperating with said pointer, a first gear positioned within said slot meshing with said rack bar for raising and lowering said measuring rod, a shaft secured to said first gear and extending to without said housing, an operating knob secured to said shaft without said housing, a second gear positioned within said vertical slot meshing with said rack bar, a shaft secured at one end thereof to said second gear, a third gear secured to the other end of said last mentioned shaft within said housing, a drum scale rotatably secured within said housing, a shaft secured within said drum scale at the center thereof, a fourth gear secured on said last mentioned shaft meshing with said third gear, said second, third, and fourth gears being of such diameters that said drum scale will be caused to make one revolution for each linear inch of movement of said measuring rod, a port in said housing in front of said drum scale permitting observation of said drum scale from without said housing, and a reference line on said housing adjacent said last mentioned port for observing the position of said drum scale.

References Cited in the file of this patent

UNITED STATES PATENTS

| | | |
|---|---|---|
| 914,855 | Mastrangel | Mar. 9, 1909 |
| 1,217,850 | Smith | Feb. 27, 1917 |
| 1,414,142 | Levy | Apr. 25, 1922 |
| 2,117,841 | Fitzgerald | May 17, 1938 |
| 2,303,858 | Ostberg | Dec. 1, 1942 |
| 2,510,822 | Jacot et al. | June 6, 1950 |
| 2,581,264 | Levesque | Jan. 1, 1952 |

FOREIGN PATENTS

| | | |
|---|---|---|
| 3,648 (of 1895) | Great Britain | Nov. 16, 1895 |
| 33,007 | Switzerland | Sept. 13, 1904 |
| 260,891 | Switzerland | Apr. 15, 1949 |